June 21, 1960  A. C. PETERSON  2,941,355
GAS TURBINE AND GAS GENERATOR MEANS
Filed Sept. 7, 1955  2 Sheets-Sheet 1

INVENTOR.
Adolphe C. Peterson.

June 21, 1960  A. C. PETERSON  2,941,355
GAS TURBINE AND GAS GENERATOR MEANS

Filed Sept. 7, 1955  2 Sheets-Sheet 2

INVENTOR.

Adolph C. Peterson.

United States Patent Office 2,941,355
Patented June 21, 1960

2,941,355
GAS TURBINE AND GAS GENERATOR MEANS

Adolphe C. Peterson, 4623 Bruce Ave. S., Minneapolis 10, Minn.

Filed Sept. 7, 1955, Ser. No. 532,850

7 Claims. (Cl. 60—39.15)

My invention relates to gas turbines of the internal combustion type and especially to a unit which may be used as a gas turbine or as a gas generator means for use with other turbine means, and it is therefore called gas turbine and gas generator means.

The chief objects of my invention are to provide a simplified gas turbine of a unitized rotor type which, because of its simplicity of construction, and its unitized character, will be of especially low cost in manufacture in comparison to its power output and its efficiency in the use of fuel for the production of that power output. A most important object also is to provide a form of gas turbine, for use either directly as a power unit or in conjunction with another power turbine, as a gas generator, which form will have inherent cooling of all parts and elements, which are subjected to the high temperature of combustion and the stresses of high rotative speed, so that it may be used at a relatively high temperature of the working gases and therefore will by such high temperature be highly efficient in the use of fuel. A most important object is the provision of a unitized compressor and turbine rotor, wherein the functions of air compression and also impulsion by the working gases are so combined in a single unit, operating in one set of bearings and in a single casing, so that the entire unit is relatively short in length and light in weight and also relatively low in cost of manufacture, and low in cost of maintenance. In general the object is the provision of an improved form of gas turbine for use either as a work unit in itself or especially for use as an efficient form of gas pressure generator means for provision of a working pressure fluid for use in any second and power turbine for a flexible source of power for use as in vehicles of any kind.

The principal devices and combinations of devices comprising my invention are as hereinafter described and as defined in the claims. In the accompanying drawings which illustrate my invention, like characters refer to like parts throughout the views. Referring to the drawings:

Figure 1:
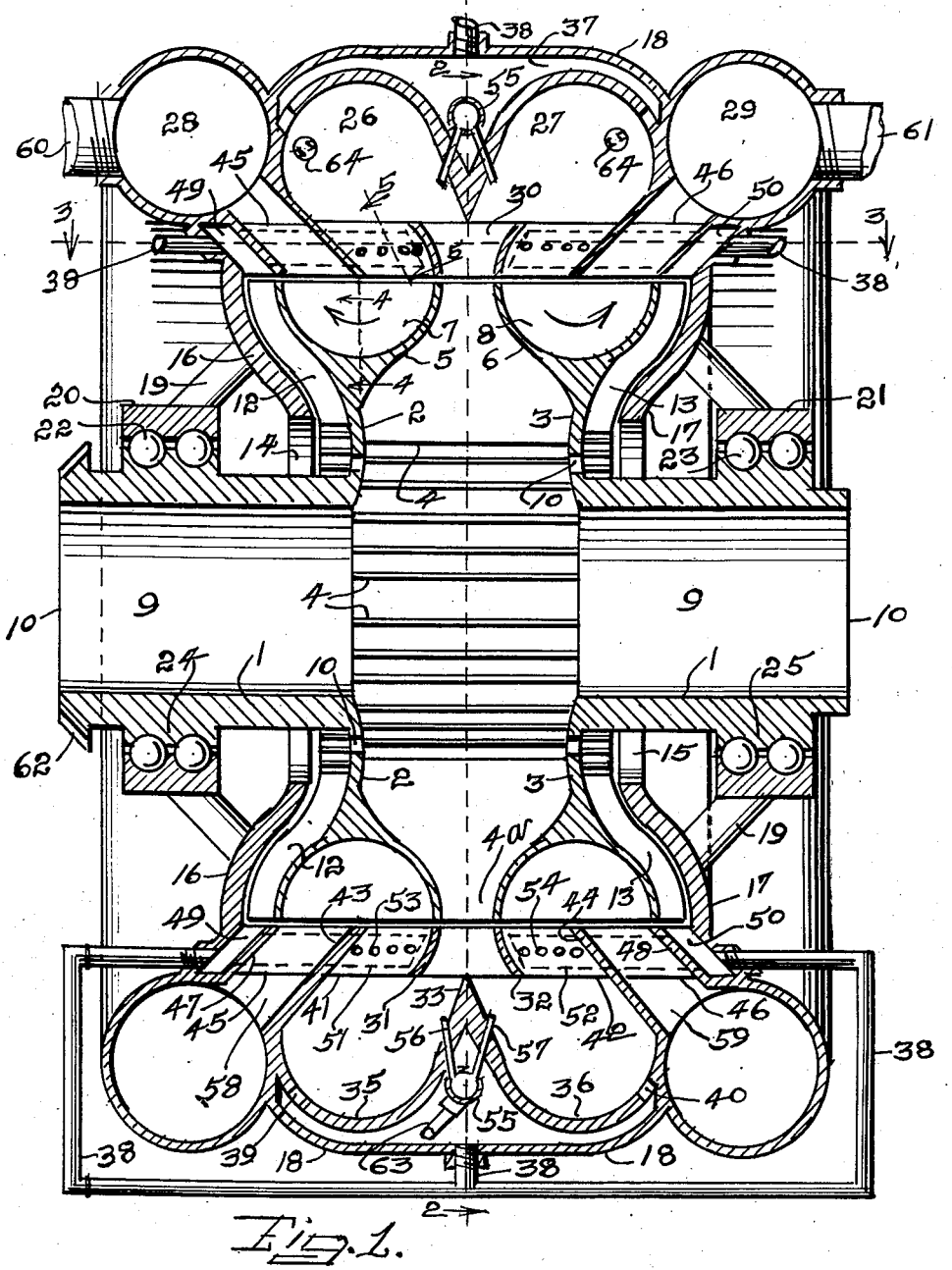
Figure 1 is a view in vertical section on a plane passing through the axial center of the working elements of my device, the section being on the line 1—1 of Figure 2, some parts broken away, some parts being shown in full elevation.
Figure 2:
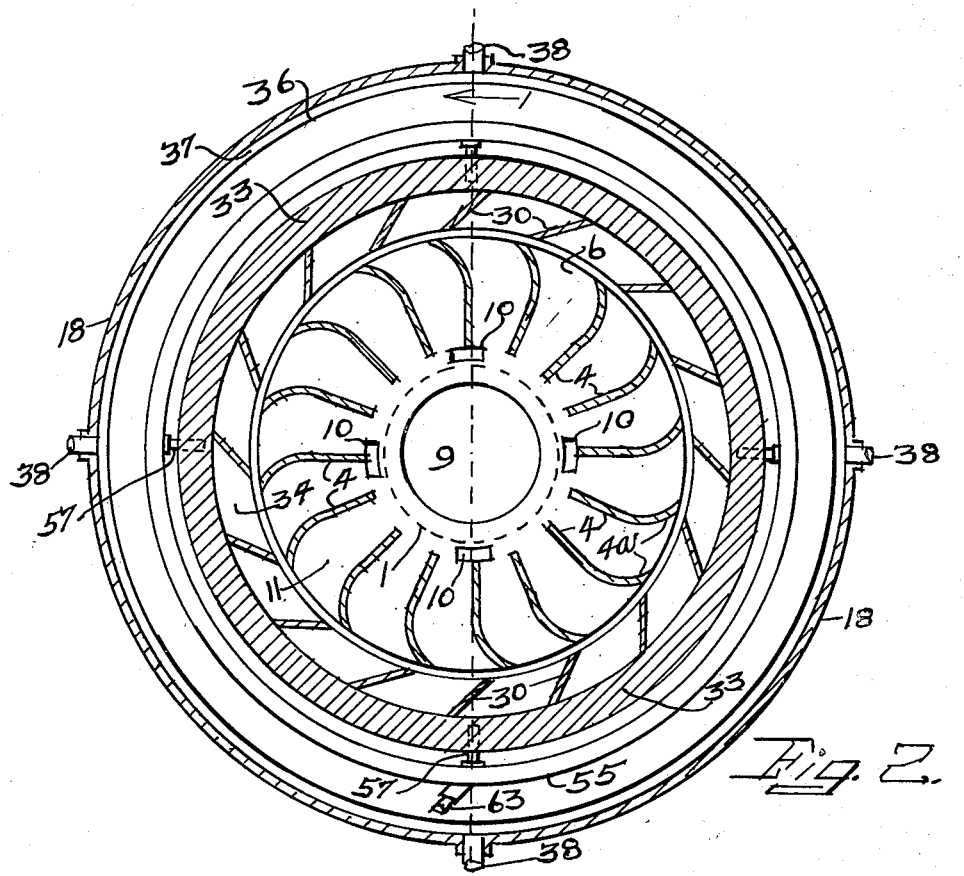
Figure 2 is a section on a plane transversely of and at right angles to the axial center of the working elements of the device and to the axial center of Figure 1 and the view there shown, this section being on a scale which is approximately two-thirds that of Figure 1.
Figure 3:
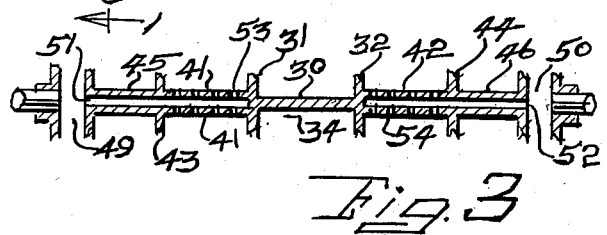

Figure 3 is a detail sectional view along the line 3—3 of Figure 1 and through single blades in line from one side of the device as viewed in Figure 1 to the other side, the blades shown in this view being all of them, static blades, or stator blades for direction or guiding of flow of air and gases, all walls annularly around the casing being broken away immediately adjacent the single blades shown.

Figure 4:
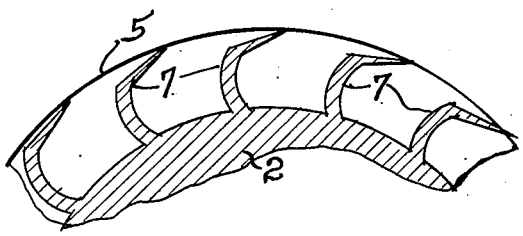

Figure 4 is a section on the line 4—4 of Figure 1, through merely a short sector of one of the turbine impulsion means, to show one type of bucket which may be used in said impulsion means, this sector being illustrative of the form of bucket construction annularly around the rotor, in the plane of the line 4—4, and being also illustrative of the type of bucket in the other impulsion means, this being not illustrated since it is similar in construction and form.

Figure 5:
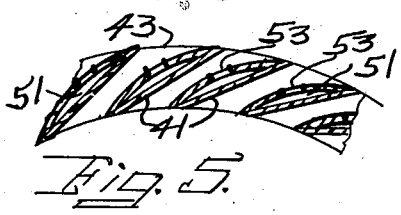

Figure 5 is a section on the line 5—5 of Figure 1 through a short sector of the gas guiding vanes forming the gas nozzles for one of the impulsion means, this sector being illustrative of the construction of such nozzle means annularly around the rotor, in the casing, the construction of the nozzle means of the other impulsion means being similar and therefore not specifically illustrated.

There is one rotor unit in the device and this has an axial shaft means, which may be formed in any manner as a solid or tubular means, but is shown as a tubular member of two parts each denoted 1 and the two parts are axially coincidental and are rigidly united together, spaced apart however, by a rotor construction which is comprised of the two disk members 2 and 3, respectively and intermediately mounted on formed compressor blades 4, and the two annular bucket channels 5 and 6, respectively, the latter having the bucket blades or buckets denoted 7 and 8, respectively. The annular bucket channels are formed, one with each disk 2 and 3, and so that their axes are coincidental with the axis of shaft 1, and so that the buckets 7 and 8 are in the two stages annularly of the rotor, as shown, and are open peripherally and externally of the rotor, to the casing and guide blade construction, which is hereinafter described. The compressor blades 4 form a compressor of the centrifugal type which receives the major portion of air compressed from centrally of the compressor means and thereby from the air conduit means, designated 9 which is internally of the shaft means 1 and which is open at each of its extreme opposite ends to atmospheric air which may enter at the open air intakes 10, one at each end of conduit 9. Ports 10 formed in the disks 2 and 3 may also admit atmospheric air, as hereafter described, and the latter ports may if desired, be so large in size that a major portion or even all of the atmospheric air supplied to the compressor 4, may come through the ports 10. The compressor blades 4 have between them the air channels 11 for the passage of the air for compression, peripherally outwardly from the rotor into the guide means as hereinafter described.

The rotor means, which has been described, has also affixed to or formed integrally with the disk members 2 and 3 and their bucket channels 5 and 6, respectively, air compressor blades or vanes 12 and 13, respectively, the vanes 12 being formed on the external side of disk member 2 and its channel member 5 and the vanes 13 being formed on the external side of disk member 3 and its channel member 6 and there are annularly of shaft means 1 but radially inwardly of the vanes 12 and 13, spaces which are respectively aligned with and adjacent to the annular passages 14 and 15 which are formed in the casing disk members 16, 17, the latter being rigidly formed or united with the peripheral or annular casing 18, and being supported by the struts 19 as a rigid static unit with the bearing races 20, 21, respectively. The latter surround and form races for the ball bearings 22, 23, which rotate on the inner races 24, 25 which are formed on or affixed on the shaft means 1, one bearing means being adjacent to and externally of one casing disk member 16 and the other adjacent to and externally of the casing disk member 17, at the opposite end of the shaft means 1.

The casing 18 is annularly exteriorly of the rotor construction has been described, and has formed within it and annularly of the space occupied by the rotor means, two annular combustion chambers 26 and 27, respectively, and two annular exhaust manifolds or conduits 28, 29, respectively, but all of these annular chambers and manifolds are separate from each other but open annularly to the space occupied by the rotor means by annular stages of guide blades and nozzles, as hereinafter described.

There are compressor diffuser blades 30 which are formed in the annular space peripherally externally of the shorter radially outward portions 4a of the compressor blades 4, immediately adjacent the portions 4a but not so close as to interfere with rotation of the rotor means and these diffuser blades 30 are generally parallel to the axis of the rotor means and supported between a pair of annular walls 31 and 32, respectively, which annularly surround the space occupied by the rotor means. The diffuser blades 30 are so located that each is approximately one-half at one side of the plane passing through the mid-section of the casing 18, which plane is the plane designated by line 2—2, Figure 1, and so that the other one-half of each such diffuser blade 30 is at the other side of that same plane, these diffuser blades 30 will thus divide the air compressed by the compressor blades or vanes 4, into two annular streams flowing radially outwardly one at one side of the dividing wall 33 which is annular and divides the two combustion chambers 26 and 27, one from the other, although each combustion chamber may receive its portion of the air compressed from the nozzle spaces 34 between the diffuser blades 30. The dividing wall 33 is formed with and between the combustion chamber walls 35, 36, which are formed annularly within the casing 18 and attached thereto, but separated from casing 18 so that there is an annular space 37 about the combustion chamber walls and the latter space receives compressed cooling air from pipes 38, and discharges this air through ports 39, and 40, which are placed annularly about the combustion chamber walls but near the lateral extremities of the annular space 37, so that this air may enter the combustion chambers 26, 27 at locations removed from the locations of the initial or main combustion.

There are two annular stages of gas nozzle blades or guides 41, 42, respectively, one between one annular wall 31 and the annular radially inward wall 43 of one combustion chamber, and one between the other annular wall 32 and the annular radially inward wall 44 of the other combustion chamber, these stages being so placed that one is laterally away from one wall 31 and the other laterally away from the other wall 32. There are also two annular stages of guide or reaction blades 45, 46, respectively, one stage between the wall 43 and an annular wall 47 and the other stage between the wall 44 and the annular wall 48, the one stage being laterally away from blades 41 and the other laterally away, the opposite direction from the guide blades 42. There are two annular chambers 49 and 50 laterally away, one on each side of the stages 45, 46, and the annular chambers 49, 50, are at their radially inward sides open, one to compression space wherein the air compressor vanes 12 are located, and the other to the compression space wherein the compressor vanes 13 are located, so that vanes 12 are directed to compress and discharge air into chamber 49 and so that vanes 13 are directed to compress and discharge air into chamber 50. The annular chamber 49 discharges air in very small streams, one into each of the air channels 51 and the other into each of the air channels 52. There is one air channel formed, as illustrated in Figure 3, through each pair of aligned vanes or blades 45 and 41, and there is also one air channel formed, as illustrated in Figure 3, through each pair of aligned vanes or blades 46 and 42. The air channels 51 discharge by very small ports 53 to the nozzles between guide blades 41, and the air channels 52 discharge by very small ports 54 to the nozzles between guide blades 42. The annular chambers 49 and 50 also discharge a portion of the compressed air, continuously, by way of the pipes 38 to the air space 37.

There is one common fuel line or pipe 55 annularly around the combustion chambers, annularly outside of dividing wall 33, and this pipe 55 discharges by a number of fuel nozzles 56 and 57, respectively, one set 56 discharging to combustion chamber 26 and the other set 57 discharging to the combustion chamber 27, the discharge from all nozzles being directed to mix fuel with the air as it emerges from the diffuser blades 30, such air having a movement which will cause it to have circulation annularly in the combustion chambers and thus this circulation will aid in procuring thorough admixture of the fuel with the air for combustion. The reaction or guide blades 45—46 direct the gases of combustion from the turbine means to the annular chambers 58, 59, which are continuations of the annular spaces wherein these blades are located, and these annular chambers discharge into the annular exhaust manifolds 28, and 29, respectively, from which the gases will discharge to the exhaust pipes 60, 61, there being as many of the latter as may be required. These pipes 60, 61, may discharge to atmosphere when the device is used as a work turbine directly, or they may discharge to secondary power turbines connected by conduits to receive the exhaust gases, when the device is used as a gas generator for supply of gases under pressure for the driving of such secondary power turbines or turbine. Such driving of secondary, disconnected power turbines by the discharged exhaust gases is well known and is not, therefore, specifically illustrated.

The shaft means 1 has formed on one end or affixed thereto, a bevel gear 62 by means of which the turbine device may be used to drive any form of work appliance or means. Fuel supply pipe 63 supplies fuel under pressure.

Having described the device in detail, the operation generally is now described. It should be noted that the fuel supply pipe 63 will supply such fuel as gasoline or any fuel oil as usually used in gas turbines, and that the fuel is supplied through the pipe 63 under a pressure which is considerably in excess of the pressure of air supplied to the combustion chambers and that any means such as is commonly used in gas turbines, may be used to deliver such fuel under the required pressure, which may be a few hundred pounds per square inch, through pipe 63 to the common fuel line 55 and the fuel nozzles 56, 57. Such fuel supply means may be operated by the shaft means 1 in any manenr as is done in gas turbines, or such fuel supply means may be any other means of supplying the fuel under pressure and such as will supply it in the required measured quantity and under the required pressure. Spark plugs 64 provide ignition by any current supply therefor.

Any such starting means as is usually used in gas turbine units or in conjunction with them, may be used to start the shaft means 1 and the rotor means in rotation, at the required speed for starting of the turbine, and such means may be any means incorporated with the gas turbine itself, or such as used in starting means for turbines. Likewise any governor means such as is commonly known for controlling the turbine and its fuel supply means, may be used, and is not shown since such means are commonly known. Having started the shaft means 1 and rotor in rotation at a sufficient speed and having caused the fuel supply means to supply the requisite fuel under pressure, the turbine will take up its cycle of operation, which is as follows: atmospheric air is drawn into the open ends of the shaft means 1, at each of its ends, and this air passes to the compressor 4 between the blades 4 to be compressed therein as air is compressed in centrifugal compressors. The air as compressed passes under higher pressures into the more restricted space of the compressor at its periphery portions between the parts 4a of the blades, these parts being narrower and occupying a narrower space, and the air under a pressure which may be say from eighty to one hundred or one hundred fifty pounds, more or less, passes peripherally outwardly from the blades 4 (4a) to the spaces or nozzles between the diffuser blades 30. There the compressed air as divided by the dividing wall 33 passes in two annular streams to the spaces or portions of spaces of the combustion chambers 26, 27, which are nearest the dividing wall 33 and there the fuel is sprayed into the air from fuel nozzles 56, 57, and the combusting air under increasingly high temperature has in general two movements, one a circulating movement annularly of the combustion chambers, caused by the diffuser blades 30, and two, a swirling movement around the outer edge of the combustion spaces, as directed by the walls of the combustion chambers. The combustion gases are somewhat diluted and cooled by air entering through ports 39—40 from space 37 and as so cooled the gases and air, as supplied in excess, pass along the annular wall 43 in combustion chamber 26, and along the annular wall 44 in combustion chamber 27, that is along the combustion chamber sides of these walls, and the gases from chamber 26 pass between the guide blades 41 and through the nozzles therebetween, and the gases from chamber 27 pass between the guide blades 42 and through the nozzles therebetween, and all of such gases are so directed by the guide blades that the gases are directed in the necessary direction, tangentially or tangentially in direction with inclination toward the buckets of the rotors, so that the gases all serve to impel the rotor means in the one direction of rotation. The gases from the combustion chambers enter the buckets of the two channels 5 and 6, in that side which is nearest the space of the rotor means which is occupied by the compressor blades 4 (separated however from them) and the gases then circulate in the buckets, that is from the entering side of the buckets 7 and 8 to the discharging sides of the buckets, that is the sides of the buckets which are most removed from the space occupied by compressor blades 4, and the gases then pass from the buckets to the spaces or nozzles between the guide blades 45 and 46, respectively, and the gases pass from these nozzles through annular spaces 58—59, to the annular manifolds 28, 29, and from these manifolds the gases pass to the exhaust pipes 60—61, and by these pipes, the gases may pass to any such secondary power turbine as may be used with the device, or if not so used for a secondary power turbine combination, the gases may pass to atmosphere or by way of any other means, to atmosphere.

It will be seen, that one division of the combustion gases pass from the combustion chamber 26, through its associated nozzles, peripherally about the one channel 5, to the one similar side of all buckets 7 of the one channel 5, passing then to its associated exhaust manifold 28; and likewise, that the other division of the combustion gases pass from the combustion chamber 27, through its associated nozzles, peripherally about the other channel 6, to the one similar side of all buckets 8 of the channel 6, passing then to its associated exhaust manifold 29. Combustion gases in each channel turn in the direction of the arrows in Figure 1, gases in all buckets 7 moving according to the arrow in channel 5 and gases in all buckets 8 moving according to the arrow in channel 6, the gases in both channels moving continuously in the direction of the arrows (for the respective channel), and the gases in all buckets of both channels, exerting impulsion to rotate the rotor means, in the same direction of rotation.

During the operation, there are two other streams of compressed air, formed by the compressor blades 12 and 13 which are on the laterally exterior sides of the rotor disks 2 and 3 and their channels, and air for these streams enters through annular ports 14—15, and the air is compressed by the compressor vanes or blades 12, 13, and the compressed air enters the annular chambers 49 and 50, and air therefrom, passes in small part through pipes 38 to space 37 and through small ports 39—40 (any number thereof), to the combustion chambers 26, 27; and the air passes in many small streams through the channels or passages 51—52, in the guide blades 45—41, and 46—42, and these air streams pass outwardly from such guide blades by way of the very small apertures 53—54, to join with the combustion gases passing to the turbine buckets, to aid in driving them. Such streams, to ports 39—40 and through channels to apertures 53—54, serve to cool the combustion chamber walls, and also to cool the metal or other walls of the guide blades forming the nozzles which pass gases to the turbine buckets, and thereby cool them.

The small streams of air passing through the channels 51—52, are somewhat heated when passing through the guide blades 45 and 46 and this heating of these streams is in the nature of regenerative heating, so that thus heat of the exhaust gases from the combustion chambers 26—27 to exhaust manifolds 28—29, that is, as these gases pass from the buckets 7 and 8, is in some degree conserved and that heat adds to the impulsion effect of the gases upon the turbine buckets. Since gases pass in both directions laterally of the turbine means, there is a balancing thereby of the thrust axially of the turbine gases, and this results in that, this device is well-balanced in the application of the torque or impulsion of gases upon the rotor means. The passing of cooling air streams on each side of each disk 2 and 3, and also on each side of each annular channel 5 and 6, results in a substantial and effective cooling of the bucket channels and also by heat conduction of the buckets themselves throughout their entire surface areas, and it thereby results that considerably higher temperatures may be used in this device, than such as are used in gas turbines generally known. I contemplate that each of the two major parts of this device, that is the rotor means and the casing means with its devices, may be constructed of as many parts or sections as is necessary for effective production of the device, and that such sections may be united together to form such major parts by any means such as welding, or bolting, as commonly used in turbines for their construction. The turbine buckets, especially, may have any conformation such as commonly used in turbines.

While I have shown my device as constituted of specific detailed devices, I contemplate that other detailed devices and combinations of devices may be used in the realization of my invention, without departing from the spirit and contemplation thereof.

What I claim is:

1. A gas turbine comprising: an axial shaft, a pair of annular channeled mounting elements, the said mounting elements being spaced apart and having each radially outwardly facing buckets with inter-spaced bucket blades; a securing means between said mounting elements and the axial shaft by which the mounting elements and the axial shaft are fixed together for rotation and including centrifugal compressor vanes intermediately of said mounting elements annularly of the axial shaft and each affixed at one end to the adjacent side of one mounting element and at the other end to the adjacent side of the other mounting element; air intakes centrally of the mounting elements and laterally thereof for entry of air to space intermediately of the mounting elements and intermediately of compressor vanes; a static casing annularly and exteriorly of the mounting elements, including an annular combustion chamber having an air entrance orifice means annularly and peripherally of the centrifugal compressor vanes and having a pair of gas discharge orifices annularly and peripherally of intake portions of each said channeled mounting element nearest said intermediate space, including a pair of exhaust gas receiving passages each annularly and peripherally of a discharge portion of one channeled mounting element farthest from said intermediate space for exhaust from such portions; means delivering fuel to said combustion chamber; exhaust ducts from said exhaust gas receiving passages.

2. The device as defined in claim 1, and: the said buckets of each said mounting element being further defined as each having a substantially direction reversing form to expel gases substantially radially outwardly from said buckets.

3. The device as defined in claim 1, and: the said static casing being further defined as including also an annular wall internally of said combustion chamber and projecting radially inwardly to substantially divide said combustion chamber into two sections one discharging to buckets of one said mounting element and the other to buckets of the other said mounting element; the said means delivering fuel discharging fuel to both said sections.

4. The means as defined in claim 1, and; the said channeled mounting elements being further defined as having centrifugal compressor vanes affixed thereto on their sides farthest from said intermediate space, the said static casing including a jacket space outwardly of said combustion chamber and duct means thereto from said last named centrifugal compressor vanes to receive compressed air therefrom, the said static casing including also ducts from said jacket space to said gas discharging orifices discharging to said buckets.

5. In a turbine means: a motor having a bearing shaft means and having affixed to the bearing shaft means in planes perpendicularly thereof and coaxially therewith a pair of anular channel elements spaced axially of the rotor and each having a plural number of radially reversing buckets spaced about the annular channel element in a plane perpendicular to the axis of the rotor; a centrifugally impelling compressor coaxially with the axis of the rotor and formed of impeller blades located intermediately of the said pair of annular channel elements and fixed each at the lateral ends to the adjacent sides of the annular channel elements, the said compressor having air compressor nozzles between said impeller blades and discharging peripherally and radially outwardly of the compressor and intermediately of the said annular channel elements; an air induction passage means formed radially inwardly of the said impeller blades and open laterally of the rotor for air intake; a static casing annularly of the rotor having affixed bearing means for said shaft means and including a diffuser means annularly of the impeller blades, and including formed in the casing a pair of nozzle guide means one annularly of an intake side of the turbine buckets of one said annular channel element and discharging radially inwardly thereto and one annularly of an intake side of the turbine buckets of the other said annular channel element and discharging radially inwardly thereto, and including a pair of turbine discharge ports one annularly of a discharge side of the turbine buckets of one said annular channel element and one annularly of a discharge side of the turbine buckets of the other said annular channel element; a combustion chamber means interposed between the diffuser means and the pair of nozzle guide means and forming means by which air as compressed is passed from the diffuser means for combustion in the combustion chamber means and gases are passed for discharge by said nozzle guide means to the turbine buckets of each said annular channel element; means to inject fuel into the air passing from said diffuser means to said combustion chamber means; a supplementary air compressor means formed of impeller blades affixed to and laterally exteriorly of said annular channel elements, and annular air reception means in said casing to receive air under pressure from said supplementary air compressor means, and air cooling passages passing air from said reception means along the sides of walls of said nozzle guide means opposite to the side along which hot gases flow and therefrom to the said turbine nozzle guide means to unite with gases flowing therethrough.

6. In a turbine means: a rotor having a bearing shaft means and having affixed to the bearing shaft means in planes perpendicularly thereof and coaxially therewith a pair of annular channel elements spaced axially of the rotor and each having a plural number of radially reversing buckets spaced about the annular channel element in a plane perpendicular to the axis of the rotor; a centrifugally impelling compressor coaxially with the axis of the rotor and formed of impeller blades located intermediately of the said pair of annular channel elements and fixed each at the lateral ends to the adjacent sides of the annular channel elements, the said compressor having air compressor nozzles between said impeller blades and discharging peripherally and radially outwardly of the compressor and intermediately of the said annular channel elements; an air induction passage means formed radially inwardly of the said impeller blades and open laterally of the rotor for air intake; a static casing annularly of the rotor having affixed bearing means for said shaft means and including a diffuser means annularly of the impeller blades, and including formed in the casing a pair of nozzle guide means one annularly of an intake side of the turbine buckets of one said annular channel element and discharging radially inwardly thereto and one annularly of an intake side of the turbine buckets of the other said annular channel element and discharging radially inwardly thereto, and including a pair of turbine discharge ports one annularly of a discharge side of the turbine buckets of one said annular channel element and one annularly of a discharge side of the turbine buckets of the other said annular channel element; a combustion chamber means interposed between the diffuser means and the pair of nozzle guide means and forming means by which air as compressed is passed from the diffuser means for combustion in the combustion chamber means and gases are passed for discharge by said nozzle guide means to the turbine buckets of each said annular channel element; means to inject fuel into the air passing from said diffuser means to said combustion chamber means; a supplementary air compressor means formed laterally exteriorly of the rotor and having impeller blades fixed on said annular channels, and annular air reception means in said casing to receive air under pressure from said supplementary air compressor means, and air cooling passages passing air from the reception means along the exterior sides of walls of said combustion chamber means opposite to the sides along which hot gases flow and therefrom to the streams of combustion gases passing to said nozzle guide means and thereby to said turbine buckets.

7. A gas turbine comprising: an axial shaft, a pair of annular channeled mounting elements, the said mounting elements being spaced apart and having each radially outwardly facing buckets with interspaced bucket blades, the said buckets having each a substantially direction reversing form to expel gases substantially radially outwardly from said buckets; a securing means between said mounting elements and the axial shaft by which the mounting elements and the axial shaft are fixed together for rotation and including centrifugal compressor vanes intermediately of said mounting elements annularly of the axial shaft and each affixed at one end to the adjacent side of one mounting element and at the other end to the adjacent side of the other mounting element; air intakes centrally of the mounting elements and laterally thereof for entry of air to the space intermediately of the mounting elements and intermediately of said compressor vanes; a static casing annularly and exteriorly of the mounting elements, said static casing including a combustion chamber means having an air entrance orifice means annularly and peripherally of the centrifugal compressor vanes and having a pair of gas discharge orifices one annularly and peripherally of the intake portions of the buckets of one channeled mounting element nearest said intermediate space and the other annularly and peripherally of intake portions of the buckets of the other channeled mounting element nearest said intermediate space and each of said gas discharge orifices having a plural number of spaced guide nozzles guiding gases approximately tangentially into said intake portions, said static casing including a pair of exhaust gas receiving passages each annularly and peripherally of a discharge portion of one channeled mounting element farthest from said intermediate space for exhaust from such portions; means delivering fuel to said combustion chamber means; exhaust ducts from said exhaust gas receiving passages.

References Cited in the file of this patent

UNITED STATES PATENTS

| | | |
|---|---|---|
| 1,395,995 | George | Nov. 1, 1921 |
| 2,168,726 | Whittle | Aug. 8, 1939 |
| 2,256,198 | Hahn | Sept. 16, 1941 |
| 2,694,291 | Rosengart | Nov. 16, 1954 |

FOREIGN PATENTS

| | | |
|---|---|---|
| 550,374 | Germany | May 17, 1932 |